United States Patent
Chin-Chin

(10) Patent No.: US 6,748,838 B1
(45) Date of Patent: Jun. 15, 2004

(54) TABLE SAW HAVING A ROTATION STRUCTURE

(76) Inventor: Chang Chin-Chin, No. 2, Alley 113, Lane 967, San Feng Road, Feng Yuan, Taichung Hsien (TW)

( * ) Notice: Subject to any disclaimer, the term of this patent is extended or adjusted under 35 U.S.C. 154(b) by 21 days.

(21) Appl. No.: 10/313,631

(22) Filed: Dec. 6, 2002

(51) Int. Cl.⁷ .............................................. B23D 19/00
(52) U.S. Cl. ...................... 83/477.2; 83/491; 83/508.2
(58) Field of Search .................. 83/477.1, 477.2, 83/473, 608, 508.2, 471.3, 574, 432, 581, 481, 491, 490, 603, 582, 98, 99, 168

(56) References Cited

U.S. PATENT DOCUMENTS

| | | | | |
|---|---|---|---|---|
| 2,844,173 A | * | 7/1958 | Gaskell | 83/477.1 |
| 3,139,124 A | * | 6/1964 | Hoff | 83/564 |
| 4,774,866 A | * | 10/1988 | Dehari et al. | 83/478 |
| 5,016,510 A | * | 5/1991 | Gardner | 83/471.2 |
| 5,561,907 A | * | 10/1996 | Campbell et al. | 30/371 |
| 5,960,691 A | * | 10/1999 | Garuglieri | 83/471.2 |
| 6,101,726 A | * | 8/2000 | Laverick | 30/392 |
| 6,283,002 B1 | * | 9/2001 | Chiang | 83/477.1 |
| 6,595,096 B2 | * | 7/2003 | Ceroll et al. | 83/473 |
| 6,640,683 B2 | * | 11/2003 | Lee | 83/477.2 |
| 2002/0017184 A1 | * | 2/2002 | Gass et al. | 83/477.2 |

* cited by examiner

Primary Examiner—Allan N. Shoap
Assistant Examiner—Ghassem Alie
(74) Attorney, Agent, or Firm—Connolly Bove Lodge & Hutz LLP

(57) ABSTRACT

A table saw having a rotation structure includes a work table, a suspension rod, a swing seat, a rotation seat, a push lever, two torsion springs, and a threaded rod. When the threaded rod is rotated, the push lever is displaced horizontally to push the rotation seat to rotate, so that the circular blade is moved upward, thereby adjusting the cutting height of the circular blade. Thus, the push lever is urged by the elastic force of the two torsion springs, so that the push lever is closely and rigidly combined with the threaded rod, thereby eliminating the clearance between the push lever and the threaded rod, so that the cutting height of the circular, blade is adjusted exactly and precisely, thereby enhancing the cutting efficiency of the table saw.

12 Claims, 3 Drawing Sheets

TABLE SAW HAVING A ROTATION STRUCTURE

BACKGROUND OF THE INVENTION

1. Field of the Invention

The present invention relates to a table saw having a rotation structure, and more particularly to a table saw having a rotation structure, wherein the cutting height of the circular blade is adjusted exactly and precisely, thereby enhancing the cutting efficiency of the table saw.

2. Description of the Related Art

A conventional table saw in accordance with the prior art comprises a threaded rod which is rotated to push and rotate a rotation seat, so that the circular blade is moved upward by rotation of the rotation seat, thereby adjusting the cutting height of the circular blade. However, a clearance is formed between the rotation seat and the threaded rod during rotation of the threaded rod, so that the cutting height of the circular blade cannot be adjusted exactly and precisely, thereby decreasing the cutting efficiency of the conventional table saw.

SUMMARY OF THE INVENTION

The present invention has arisen to mitigate and/or obviate the disadvantage of the conventional table saw.

The primary objective of the present invention is to provide a table saw having a rotation structure, wherein the push lever is urged by the elastic force of the two torsion springs, so that the push lever is closely and rigidly combined with the threaded rod, thereby eliminating the clearance between the push lever and the threaded rod during rotation of the threaded rod, so that the cutting height of the circular blade is adjusted exactly and precisely, thereby enhancing the cutting efficiency of the table saw.

Another objective of the present invention is to provide a table saw having a rotation structure, wherein the threaded rod is rotated by the hand wheel, so that the push lever screwed on the threaded rod is displaced horizontally, so as to push the rotation seat to rotate relative to the swing seat, so that the circular blade is moved upward by rotation of the rotation seat to protrude outward from the cutting slot of the work table, thereby adjusting the cutting height of the circular blade.

In accordance with the present invention, there is provided a table saw having a rotation structure, comprising:

a work table;

a suspension rod secured on a bottom of the work table;

a swing seat pivotally mounted on the suspension rod;

a rotation seat rotatably mounted on the swing seat and having two side plates;

a push lever secured on the rotation seat and having two ends each protruded outward from a respective one of the two side plates of the rotation seat;

two torsion springs each mounted on a respective one of the two side plates of the rotation seat and each having a first end secured on the respective side plate of the rotation seat and a second end secured on a respective one of the two ends of the push lever; and a threaded rod rotatably mounted on the swing seat, and screwed into the push lever.

Further benefits and advantages of the present invention will become apparent after a careful reading of the detailed description with appropriate reference to the accompanying drawings.

DETAILED DESCRIPTION OF THE INVENTION

Figure 1:
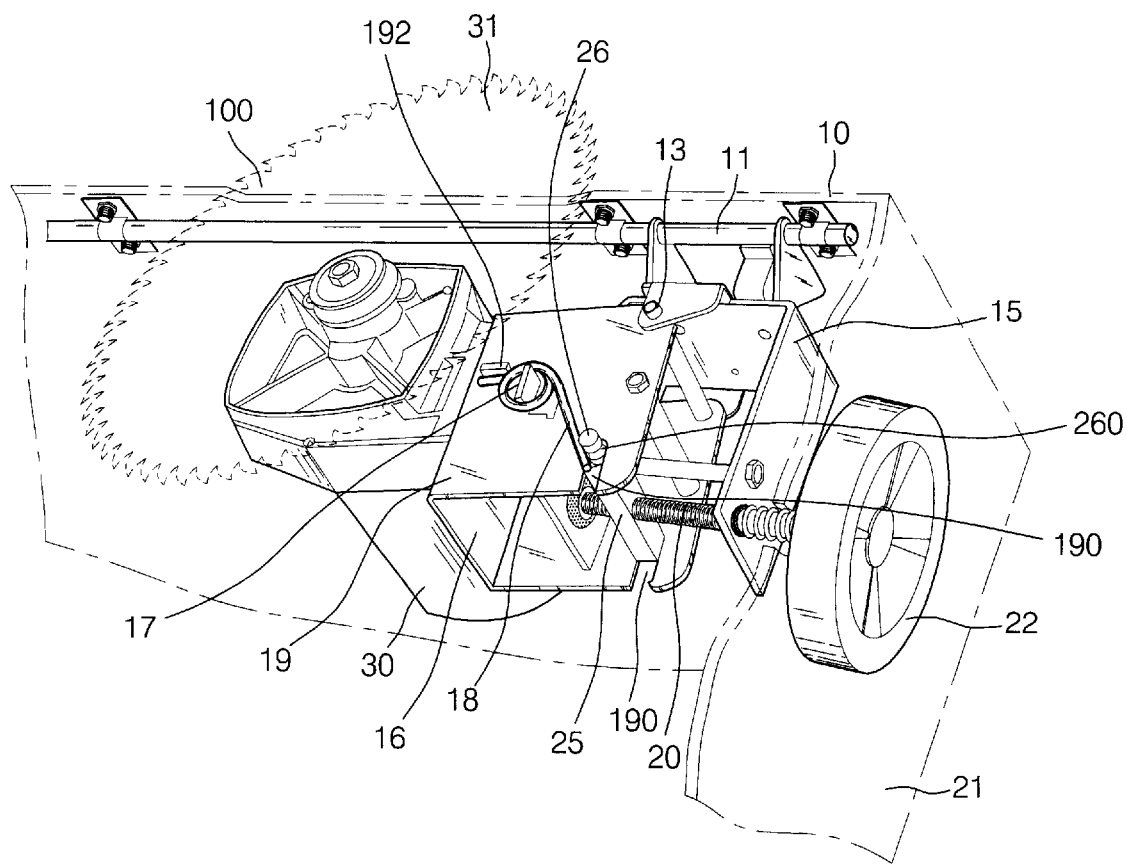
FIG. 1 is a perspective assembly view of a table saw having a rotation structure in accordance with a preferred embodiment of the present invention.
Figure 2:
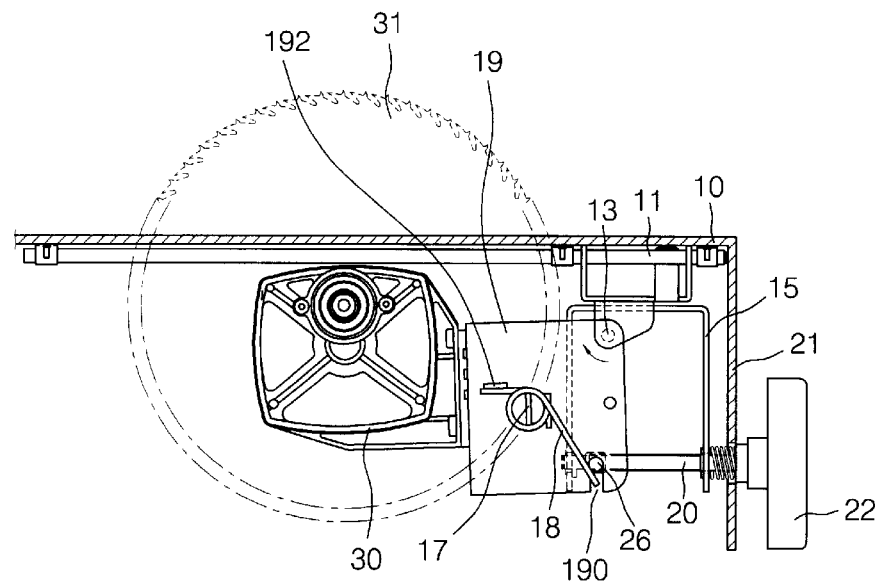
FIG. 2 is a side plan cross-sectional view of the table saw having a rotation structure as shown in FIG. 1.
Figure 3:
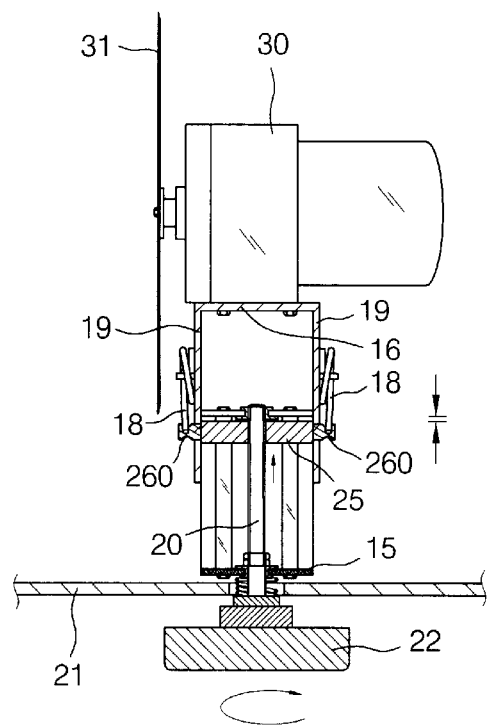
FIG. 3 is a top plan cross-sectional view of the table saw having a rotation structure as shown in FIG. 1.

Referring to the drawings and initially to FIGS. 1–3, a table saw in accordance with a preferred embodiment of the present invention comprises a work table 10 formed with a cutting slot 100 for passage of a circular blade 31 that is used to cut the workpiece (not shown). A suspension rod 11 is secured on the bottom of the work table 10. A substantially inverted U-shaped swing seat 15 is pivotally mounted on the suspension rod 11. A substantially U-shaped rotation seat 16 is rotatably mounted on the swing seat 15 by a pivot shaft 13. A push lever 25 is secured on a first side of the rotation seat 16.

A motor seat 30 is secured on a second side of the rotation seat 16 to rotate therewith. The circular blade 31 is rotatably mounted on the motor seat 30, and is extended through the cutting slot 100 of the work table 10. A threaded rod 20 is rotatably mounted on the swing seat 15, and has a first end screwed into the push lever 25 and a second end extended through a front panel 21 of the work table 10 and provided with a hand wheel 22 which is used to rotate the threaded rod 20.

Figure 4:
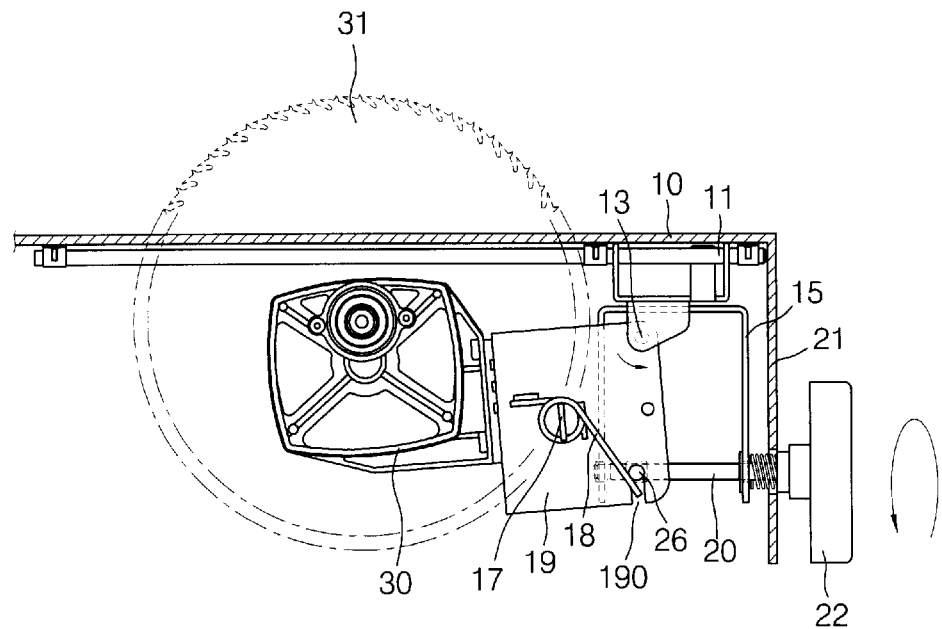
FIG. 4 is a schematic operational view of the table saw having a rotation structure as shown in FIG. 2 in use.
Figure 5:
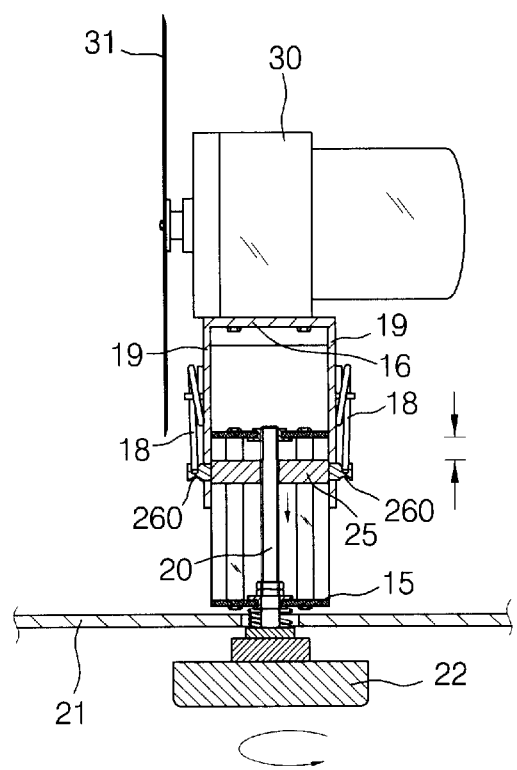
FIG. 5 is a schematic operational view of the table saw having a rotation structure as shown in FIG. 3 in use.

In operation, referring to FIGS. 2–5 with reference to FIG. 1, the threaded rod 20 is rotated by the hand wheel 22, so that the push lever 25 screwed on the threaded rod 20 is displaced horizontally as shown in FIGS. 3 and 5, so as to push the rotation seat 16 to rotate about the pivot shaft 13 relative to the swing seat 15 as shown in FIGS. 2 and 4, so that the motor seat 30 and the circular blade 31 are moved upward by rotation of the rotation seat 16, and the circular blade 31 is further protruded outward, from the cutting slot 100 of the work table 10, thereby adjusting the cutting height of the circular blade 31.

The rotation seat 16 has two side plates 19 each formed with an insertion slot 190. The push lever 25 has two ends each formed with a circular head 26 inserted into the insertion slot 190 of a respective one of the two side plates 19 of the rotation seat 16.

The table saw in accordance with the present invention further comprises two torsion springs 18 each mounted on a respective one of the two side plates 19 of the rotation seat 16, and each having a first end secured on the respective side plate 19 of the rotation seat 16 and a second end secured on the circular head 26 of a respective one of the two ends of the push lever 25. Each of the two side plates 19 of the rotation seat 16 is provided with a support rack 17 for mounting the respective torsion spring 18. Each of the two side plates 19 of the rotation seat 16 is provided with a catch block 192 rested on the first end of the respective torsion spring 18. The circular head 26 of each of the two ends of the push lever 25 is formed with an annular retaining groove 260 for retaining the second end of the respective torsion spring 18.

In such a manner, each of the two torsion springs 18 is mounted on a respective one of the two side plates 19 of the rotation seat 16, with its first end urged on the catch block 192 of the respective side plate 19 of the rotation seat 16 and with its second end retained in and urged on the retaining groove 260 of the respective circular head 26 of the push lever 25.

Thus, the push lever 25 is urged by the elastic force of the two torsion springs 18, so that the push lever 25 is closely and rigidly combined with the threaded rod 20, thereby eliminating the clearance between the push lever 25 and the threaded rod 20 during rotation of the threaded rod 20, so that the cutting height of the circular blade 31 is adjusted exactly and precisely, thereby enhancing the cutting efficiency of the table saw.

Accordingly, in the table saw in accordance with the present invention, the threaded rod 20 is rotated by the hand wheel 22, so that the push lever 25 screwed on the threaded rod 20 is displaced horizontally, so as to push the rotation seat 16 to rotate relative to the swing seat 15, so that the circular blade 31 is moved upward by rotation of the rotation seat 16 to protrude outward from the cutting slot 100 of the work table 10, thereby adjusting the cutting height of the circular blade 31. In addition, then push lever 25 is urged by the elastic force of the two torsion springs 18, so that the push lever 25 is closely and rigidly combined with the threaded rod 20, thereby eliminating the clearance between the push lever 25 and the threaded, rod 20 during rotation of the threaded rod 20, so that the cutting height of the circular blade 31 is adjusted exactly and precisely, thereby enhancing the cutting efficiency of the table saw.

Although the invention has been explained in relation to its preferred embodiment(s) as mentioned above, it is to be understood that many other possible modifications and variations can be made without departing from the scope of the present invention. It is, therefore, contemplated that the appended claim or claims will cover such modifications and variations that fall within the true scope of the invention.

What is claimed is:

1. A table saw having a rotation structure, comprising:
   a work table;
   a suspension rod secured on a bottom of the work table;
   a swing seat pivotally mounted on the suspension rod;
   a rotation seat rotatably mounted on the swing seat and having two side plates;
   a push lever secured on the rotation seat and having two ends each protruded outward from a respective one of the two side plates of the rotation seat;
   two torsion springs each mounted on a respective one of the two side plates of the rotation seat and each having a first end secured on the respective side plate of the rotation seat and a second end secured on a respective one of the two ends of the push lever; and
   a threaded rod rotatably mounted on the swing seat, and screwed into the push lever.

2. The table saw having a rotation structure in accordance with claim 1, wherein each of the two side plates of the rotation seat is provided with a support rack for mounting the respective torsion spring.

3. The table saw having a rotation structure in accordance with claim 1, wherein each of the two side plates of the rotation seat is provided with a catch block rested on the first end of the respective torsion spring.

4. The table saw having a rotation structure in accordance with claim 1, wherein each of the two ends of the push lever is formed with a circular head which is formed with an annular retaining groove for retaining the second end of the respective torsion spring.

5. The table saw having a rotation structure in accordance with claim 1, wherein each of the two side plates of the rotation seat is formed with an insertion slot, and each of the two ends of the push lever is formed with a circular head inserted into the insertion slot of a respective one of the two side plates of the rotation seat.

6. The table saw having a rotation structure min accordance with claim 1, wherein the swing seat is substantially inverted U-shaped.

7. The table saw having a rotation structure in accordance with claim 1, wherein the rotation seat is substantially U-shaped.

8. The table saw having a rotation structure in accordance with claim 1, wherein the rotation seat is rotatably mounted on the swing seat by a pivot shaft.

9. The table saw having a rotation structure in accordance with claim 1, further comprising a motor seat secured on the rotation seat to rotate therewith.

10. The table saw having a rotation structure in accordance with claim 9, further comprising a circular blade rotatably mounted on the motor seat.

11. The table saw having a rotation structure in accordance with claim 1, wherein the threaded rod has a distal end extended through a front panel of the work table.

12. The table saw having a rotation structure in accordance with claim 1, wherein the threaded rod has a distal end provided with a hand wheel.

\* \* \* \* \*